United States Patent Office 3,591,679
Patented July 6, 1971

3,591,679
ANTIBACTERIAL COMPOSITIONS
Jack G. Voss, Wyoming, Ohio, assignor to The Procter & Gamble Company, Cincinnati, Ohio
No Drawing. Filed Aug. 13, 1969, Ser. No. 849,907
Int. Cl. A01n 11/00, 9/02
U.S. Cl. 424—127                                                3 Claims

ABSTRACT OF THE DISCLOSURE

Antibacterial compositions consisting essentially of (1) specific chelating agents, (2) specific organic cation-forming compounds, and (3) specific antibacterial agents whose antibacterial effectiveness is enhanced by (1) and (2) and, optionally, (4) sufficient alkaline buffering salt to maintain the pH under usage conditions between 7 and 11, and (5) optionally other compatible detergents and/or antibacterial agents; dilute aqueous solutions prepared from said compositions.

BACKGROUND OF THE INVENTION

Field of the invention

This invention relates primarily to antibacterial compositions having a high degree of antibacterial activity. More particularly, this invention relates to alkaline antibacterial compositions consisting essentially of (a) specified chelating agents, (b) specified compounds capable of giving, in aqueous solution, specified types of organic cations, and (c) specific antibacterial compounds whose effectiveness is enhanced by (a) and (b).

The desirability of controlling or eradicating common disease-causing organisms on, e.g., the human body, textiles, hard surfaces, etc., is clearly accepted. It is highly desirable to provide compositions for controlling said organisms where said compositions are also effective cleaning agents.

It is an object of this invention to provide improved anti-bacterial compositions.

SUMMARY OF THE INVENTION

The above objects and other objects which will hereinafter be apparent can be achieved by providing a composition consisting essentially of:

(I) From about 1 to about 50 parts by weight of the total composition of a chelating agent selected from the group consisting of:

(A) ethylene diaminetetraacetates;
(B) methylenediphosphonates;
(C) dibromoethylenediphosphonates;
(D) dichloromethylenediphosphonates;
(E) N-hydroxyethylethylenediaminetriacetates;
(F) diethylenetriaminepentaacetates;
(G) homopolymeric polymaleates having a molecular weight of from about 500 to about 175,000;
(H) 1,2-diaminocyclohexane-N,N'-tetraacetates;
(I) nitrilotriacetates;
(J) tripolyphosphates; and
(K) mixtures thereof, all in the form of their water soluble salts, for example, with the ethylenediaminetetraacetates the tetrasodium, tetrapotassium and tetraammonium salts of ethylenediaminetetraacetic acid.

(II) From about 0.1 to about 5 parts by weight of the total composition of organic compounds which form organic cations in aqueous solution, selected from the group consisting of:

(A) Amines having the formula

wherein R is an alkyl radical containing from about 8 to about 18 carbon atoms and having as substituents from 0 to about 1 additional amine group having the formula

said additional amine group being attached so that there is one alkyl moiety of at least about 8 carbon atoms containing no amine group as a substituent, and from 0 to about 2 halogen atoms and wherein each $R^1$ group is selected from the group consisting of hydrogen, alkyl groups containing from 1 to about 3 carbon atoms, mono halogen substituted alkyl groups containing from 1 to about 3 carbon atoms and hydroxy alkyl groups containing from 1 to about 3 carbon atoms, said halogen atoms and hydroxy groups being substituted on any of the carbon atoms in the alkyl groups;

(B) Quaternary ammonium compounds having the formula

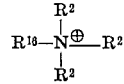

wherein $R^{16}$ is an alkyl radical containing from about 8 to about 18 carbon atoms and having as substituents from 0 to about 1 amine group having the formula

wherewherein $R^1$ has the definition hereinbefore given; from 0 to about 2 halogen atoms, and from 0 to about 1 additional quaternary ammonium group having the formula

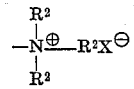

said amine group and said quaternary ammonium group being attached so that there is one alkyl moiety of at least about 8 carbon atoms containing no amine group or quaternary ammonium group as a substituent, and each R² group is selected from the group consisting of alkyl groups containing from 1 to about 3 carbon atoms, mono halogen substituted alkyl groups containing from 1 to about 3 carbon atoms, benzyl groups and hydroxy alkyl groups containing from 1 to about 3 carbon atoms, said halogen atoms and said hydroxyl groups being substituted on any of the carbon atoms in the alkyl groups and wherein X is selected from the group consisting of iodide, bromide, methosulfate, ethosulfate and chloride anions;

(C) N-alkyl pyridinium halides wherein the alkyl group contains from about 8 to about 18 carbon atoms;

(D) N-alkyl piperidines wherein the alkyl group contains from about 8 to about 18 carbon atoms;

(E) N-alkyl alkylene diamines wherein the alkyl group contains from about 8 to about 18 carbon atoms and the alkylene group contains from about 2 to about 4 carbon atoms;

(F) Sulfonium compounds having the formula

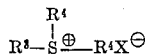

wherein R³ is a hydrocarbon group containing from about 8 to about 18 carbon atoms, wherein each R⁴ group is an alkyl group containing from 1 to about 3 carbon atoms, wherein X has the definition hereinbefore given (e.g., selected from the group consisting of iodide, bromide, chloride, methosulfate and ethanosulfate anions);

(G) 1-alkyl-2-imino imidazolidines wherein the alkyl group contains from about 8 to about 18 carbon atoms;

(H) Polyquaternary ammonium compounds having the formula:

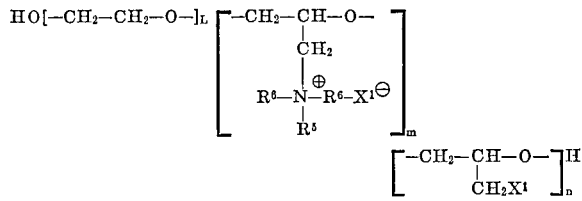

wherein R⁵ is a hydrocarbon group containing from 1 to about 24 carbon atoms, wherein said R⁶ group is a hydrocarbon group containing from 1 to about 4 carbon atoms, wherein X¹ is selected from the group consisting of chlorine, iodine, and bromine atoms, wherein L, $m$ and $n$ are integers such that L is an integer from 0 to about 50, the sum of $m$ and $n$ is from 2 to about 50, and the sum of $m$, $n$ and the number of carbon atoms in R⁵ is greater than 12; and (I) Mixtures thereof; and (III) From about 0.1 to about 5 parts by weight of an antibacterial agent selected from the group consisting of (1) antimicrobial compounds having the generic structural formula

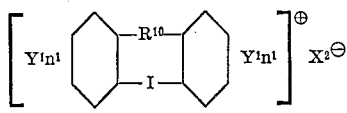

wherein R¹⁰ is selected from the group consisting of oxygen, sulfur, and —(CH₂)$_{m^1}$—, $m^1$ being an integer from 0 to 3; wherein each Y¹ represents a radical selected from the group consisting of chloro, bromo, iodo, fluoro and nitro groups; alkyl radicals containing up to 3 carbon atoms; chloro, fluoro, iodo, and bromo substituted alkyl radicals containing up to 3 carbon atoms, the substituents being on any carbon atom; amino groups; and sulfamyl groups; each $n^1$ represents an integer selected from the group consisting of 0, 1 and 2, and when an $n^1$ is 2, the corresponding Y¹ radicals can be dissimilar and wherein X² is selected from the group consisting of sulfate, chlorine, bisulfate, lactate, phosphate, iodide, phenate, 2,4,5-trichlorophenate, acetate, benzoate, citrate, bromide, fluoride, monohydrogen phosphate, dihydrogen phosphate, and nitrate anions; (2) trifluoromethyl dichlorocarbanilide, and (3) diphenyl bismuth acetate.

The composition can also contain, optionally, from 0 to about 50 parts by weight of the composition of an alkaline buffering salt selected from the group consisting of ammonium, sodium, potassium or lithium (1) carbonates, (2) bicarbonates, (3) orthophosphates, (4) monohydrogen orthophosphates, (5) pyrophosphates, (6) tripolyphosphates, (7) metaphosphates, (8) hydroxides, (9) citrates, (10) acetates, or (11) silicates having an $SiO_2:M_2O$ ratio of from about 1 to about 2.6 where M is sodium, potassium, or lithium and sufficient to maintain the pH of the composition at from about 7 to about 11 under usage conditions in aqueous solutions. Preferably, there is sufficient of each of the above components present so that under usage conditions in aqueous solutions there will be at least about 5 p.p.m. of component I, about 0.5 p.p.m. of component II and about 0.5 p.p.m. of component III.

BACTERIA

Bacterial cells are divided roughly into three parts. There is the outer cell wall, a semi-permeable cytoplasmic membrane lying just within the cell wall, and the interior of the cell which contains the vital constituents of the cell. Bacteria are divided into two major groups. One is the gram positive group and the other is the gram negative group. These groups differ in that the cell wall of the gram negative group is more complex and a much better barrier than is the cell wall of the gram positive group.

It has now been discovered that the combination of ingredients described hereinbefore is an effective antibacterial agent at low usage levels, both against gram positive bacteria and gram negative bacteria. This is totally unexpected even though certain of the individual components contained in the composition of this invention are capable of cidal action by themselves at higher usage levels. The combination of ingredients is effective at a much lower level than the individual components. The mechanism by which the individual components operate and cooperate is not completely known, but the chelating agent and organic cation appear to increase the permeability of the gram negative cell wall to the antibacterial agent.

DESCRIPTION OF THE EMBODIMENT

The chelating agent

The chelating agent, although it is an ineffective antibacterial agent by itself, is a very important component in the compositions hereinbefore described. It is believed that the chelating agent increases the effectiveness of the attack on the cell walls of the bacteria by the other ingredients when used in conjunction with the other ingredients. It is thought that the chelating agent helps remove specific portions of the cell wall, such as the calcium portion. However, the effectiveness of the chelating agent appears to be only partly a function of its ability to sequester calcium ions. While all of the chelating agents which are operative are excellent calcium ion sequestrants, other effective calcium ion sequestrants which have structures similar to those which have been found to be effective are inoperable in the present invention. The most effective chelating agents are ethylenediaminetetraacetates, N-hydroxyethylethylenediaminetriacetates and diethylenediaminepentaacetates. Sodium tripolyphosphate is especially desirable since it also acts as an alkaline buffering salt.

The preferred cations for the chelating agents of this invention are sodium, potassium and ammonium cations. Ammonium cations include substituted ammonium cations such as mono-, di- and/or triethanolammonium cations.

The organic compounds which form organic cations

It is postulated that the effect of the organic compounds which provide organic cations results from the effect of the cations in modifying the structure of the cell walls of gram negative bacteria to permit the antibacterial agent as hereinafter described, to penetrate to the cytoplasmic membrane. Although the other components of the compositions aid in the modification of the cell walls they are relatively ineffective without an organic cation present.

The organic compounds which form organic cations are of two types. The first type is an amine, e.g.,

which in aqueous solution forms the cation

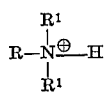

Organic compounds A, D, E and G are of this type. The second type is a quaternized amine or sulfonium compound which already contains a cation which is associated with an anion (X or $X^1$) and which disassociates in an aqueous solution to form the cation

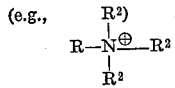

Organic compounds B, C, F and H are of this type.

The preferred organic compounds are dodecyldimethylamine (hereinafter referred to as DDA), dimethyldodecyl sulfonium iodide, 2-dodecyl-1,3 bis-(trimethylammonio) propane dibromide, dimethyldodecyl - 3(trimethylammonio) propylammonium dibromide, coconut trimethylammonium chloride, dodecyl trimethylammonium chloride, dodecyl trimethylammonium bromide, cetyltrimethyl ammonium bromide, and cetyl pyridinium chloride.

There is considerable variation in the effectiveness of the various organic cations. Furthermore, there is a variation in effectiveness of cations depending upon the type or strain of bacterium.

As mentioned hereinbefore, some of the organic cations, notably those of compounds B, C, F and H, are themselves effective antibacterial agents. The primary effect of this invention with respect to these effective organic cations is to lower the concentration at which these cations are effective.

Mixtures of organic compounds which provide cations may be especially desirable for the purpose of increasing bactericidal effectiveness to a level above that provided by a single organic cation. Desirable compounds for use in mixtures include cetyl pyridinium chloride and cetyl trimethylammonium bromide.

The antibacterial agent

The antibacterial agents of this invention are (1) antimicrobial compounds having the generic structural formula

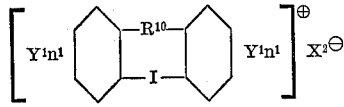

wherein $R^{10}$ is selected from the group consisting of oxygen, sulfur, and —$(CH_2)_{m^1}$—, $m^1$ being an integer from 0 to 3; wherein each $y^1$ represents a radical selected from the group consisting of chloro, bromo, iodo, fluoro and nitro groups; alkyl radicals containing up to 3 carbon atoms; chloro, fluoro, iodo, and bromo substituted alkyl radicals containing up to 3 carbon atoms, the substituents being on any carbon atom; amino groups; and sulfamyl groups; each $n^1$ represents an integer selected from the group consisting of 0, 1 and 2, and when an $n^1$ is 2, the corresponding $Y^1$ radicals can be dissimilar and wherein $X^2$ is selected from the group consisting of sulfate, chloride, bisulfate, lactate, phosphate, iodide, phenate, 2,4,5 - trichlorophenate, acetate, benzoate, citrate, bromide, fluoride, monohydrogen phosphate, dihydrogen phosphate, and nitrate anions, (2) trifluoromethyl dichlorocarbanilide, and (3) diphenyl bismuth acetate. The antibacterial effectiveness of these known, effective antibacterial agents, surprisingly, is enhanced by the combination of the chelating agent and the organic compounds which form organic cations.

Preferred examples of antibacterial agent (1) are 3-chloro-dibenzoxiodinium chloride and 3-chloro-7-nitrodibenz (b,e) (1,4) oxiodinium bisulfate. Other suitable agents include 3,7-dichlorodibenz (be) (1,4) oxiodinium bisulfate, 2-chlorodibenz (be) (1,4)oxiodinium chloride, 1-chlorodibenz(be) (1,4)oxiodinium chloride and dibenz-(be) (1,4)oxiodinium chloride, 3,7-dimethyldibenz(b,e)-(1,4)oxiodinium chloride.

The alkaline buffering salt

The primary purpose of the alkaline buffering salt is to keep the pH of the solutions of this invention in the neighborhood of from about 7 to about 11. A pH in this range can be maintained with 0 to about 50 parts by weight of the alkaline buffering salt; preferably at least 5 parts by weight is used. The antibacterial effectiveness of the compositions is enhanced in the more alkaline solutions. In fact, hydroxyl ions themselves contribute to antibacterial effectiveness. The preferred pH range is from about 8 to about 10. Lower pH's are less effective and if the pH is too high, the solutions are too likely to cause harmful effects on the skin. Also, high hydroxyl ion concentrations are in themselves antibacterial agents.

It will be noted that a chelating agent such as sodium tripolyphosphate, also has buffering ability and can be used for its chelating and/or buffering function either alone or in admixture with other chelating agents and/or buffering salts. The buffering salt is desirably a detergency builder.

The alkaline buffering salts of this invention are the ammonium and alkali metal salts of weak acids. Specific examples of alkaline buffering salts are the carbonates, bicarbonates, orthophosphates, monohydrogen orthophosphates, pyrophosphates, tripolyphosphates, metaphosphates, silicates having $SiO_2:M_2O$ ratios of from about 1 to about 2.6, preferably 1.6 to 2.6, wherein M is an alkali metal, hydroxides, citrates, and acetates of alkali metals, e.g., ammonium, sodium, potassium and lithium, and mixtures of such salts.

Preferred alkaline buffering salts are sodium carbonate and sodium tripolyphosphate. The sodium tripolyphosphate is a preferred alkaline buffering salt because of its detergency builder and chelating effects. On the other hand the sodium carbonate is often preferred because of its cheapness and the fact that it gives a higher pH.

Other ingredients

The compositions of this invention also can contain compatible detergents in amounts of from about 1 to about 20 parts by weight. Examples of compatible detergents include the following:

(A) A detergent having the formula

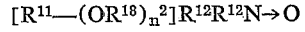

(amine oxide detergent) wherein $R^{11}$ is an alkyl group containing from about 10 to about 18 carbon atoms, from 0 to 1 methoxy group, and from 0 to about 2 hydroxy groups, $R^{18}$ is an alkylene group containing 2 or 3 carbon atoms, $n^2$ is a number from 0 to about 5, there being at least one moiety of $R^{11}$ which is an alkyl group containing at least about 10 carbon atoms and no substituent groups and each $R^{12}$ is selected from the group consisting of alkyl radicals and hydroxyalkyl radicals containing from 1 to about 3 carbon atoms;

(B) A detergent having the formula

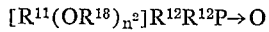

(phosphine oxide detergent) wherein $R^{11}$, $R^{18}$, $n^2$ and $R^{12}$ have the same definitions given hereinbefore;

(C) Nonionic detergents produced by condensing ethylene oxide on a hydrophobic base, e.g., a detergent having the formula $R^{13}(C_2H_4O)_xH_y$ (nonionic detergent) wherein $R^{13}$ represents a hydrophobic base which is derived from a hydrophobic compound bearing at least one active hydrogen atom, said hydrophobic compounds preferably being selected from the group consisting of (1) alkanols containing from about 8 to about 20 carbon atoms, (2) alkyl phenols (including dialkyl phenols) wherein the alkyl group contains from about 6 to about 18 carbon atoms, (3) condensation products of propylene glycol and propylene oxide having a molecular weight of from about 1500 to about 1800, (4) fatty amides containing from about 10 to about 20 carbon atoms, (5) higher alkyl mercaptans containing from about 10 to about 20 carbon atoms, (6) condensation products of propylene oxide and ethylene diamine constituting from about 20% to about 60% by weight of the finished nonionic detergent molecule and (7) condensation products of fatty alcohols containing from about 10 to about 20 carbon atoms of from about 3 to about 8 propylene oxide units, and mixtures thereof, and wherein $x$ is an integer from about 4 to about 30 for (1), (2), (4) and (5), but not less than about 0.4 of the number of carbon atoms in the hydrophobic base, and wherein $x$ is sufficiently large to give the detergent a molecular weight of from about 2,000 to about 10,000 for (3), of from about 5,000 to about 11,000 for (6) and of from about 750 to about 1800 for (7) and wherein $y$ is an integer equal to the number of ethylene oxide chains formed by replacing the active hydrogen atoms on said hydrophobic compounds;

(D) A detergent having the formula

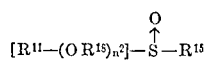

(sulfoxide detergent) wherein $R^{11}$, $R^{18}$, and $n^2$ have the same definitions given hereinbefore, and wherein $R^{15}$ is an alkyl radical containing from 1 to 3 carbon atoms and from one to two hydroxyl groups.

Specific examples of amine oxide detergents include:

dimethyldodecylamine oxide,
dimethyltetradecylamine oxide,
ethylmethyltetradecylamine oxide,
cetylmethyltetradecylamine oxide,
dimethylstearylamine oxide,
cetylethylpropylamine oxide,
diethyldodecylamine oxide,
diethyltetradecylamine oxide,
dipropyldodecylamine oxide,
bis-(2-hydroxyethyl)dodecylamine oxide,
bis-(2-hydroxyethyl)-3-dodecoxy-1-hydroxy-propylamine oxide,
(2-hydroxypropyl)methyltetradecylamine oxide,
dimethyloleylamine oxide,
dimethyl-(2-hydroxydodecyl)amine oxide, and the corresponding decyl, hexadecyl, and octadecyl homologs of the above compounds.

Specific examples of the phosphine oxide detergents include:

dimethyldodecylphosphine oxide,
dimethyltetradecylphosphine oxide,
ethylmethyltetradecylphosphine oxide,
cetyldimethylphosphine oxide,
dimethylstearylphosphine oxide,
cetylethylpropylphosphine oxide,
diethyldodecylphosphine oxide,
diethyltetradecylphosphine oxide,
dipropyldodecylphosphine oxide,
bis-(hydroxymethyl)dodecylphosphine oxide,
bis-(2-hydroxyethyl)dodecylphosphine oxide,
(2-hydroxypropyl)methyltetradecylphosphine oxide,
dimethyloleylphosphine oxide, and
dimethyl-(2-hydroxydodecyl)phosphine oxide and the corresponding decyl, hexadecyl and octadecyl homologs of the above compounds.

Specific examples of nonionic detergents include nonyl phenol condensed with either about 10 or about 30 moles of ethylene oxide per mole of phenol and the condensation products of coconut alcohol with an average of either about 5.5 or about 15 moles of ethylene oxide per mole of alcohol and the condensation product of about 15 moles of ethylene oxide with one mole of tridecanol.

Other examples include the well known detergents sold under the trade name "Pluronic" which are prepared by condensing propylene glycol with propylene oxide to form a hydrophobic base and then condensing said hydrophobic base with ethylene oxide, the hydrophobic base having a molecular weight of from about 1500 to about 1800 and the total molecule having a molecular weight of, e.g., 2000, 3000 and 8000.

Another group of suitable nonionic detergents are sold under the trade name of "Tetronic." These are prepared by condensing ethylenediamine with propylene oxide to form a hydrophobic group (molecular weight—from about 2500 to about 3000) and condensing this hydrophobic group with ethylene oxide to give a molecular weight of from 5000 to about 11,000.

Other examples include dodecylphenol condensed with 12 moles of ethylene oxide per mole of phenol; dinonylphenol condensed with 15 moles of ethylene oxide per mole of phenol; dodecyl mercaptan condensed with 10 moles of ethylene oxide per mole of mercaptan; bis-(N-2-hydroxyethyl(lauramide; nonyl phenol condensed with 20 moles of ethylene oxide per mole of nonyl phenol; myristyl alcohol condensed with 10 moles of ethylene oxide per mole of myristyl alcohol; lauramide condensed with 15 moles of ethylene oxide per mole of lauramide; and di-iso-octylphenol condensed with 15 moles of ethylene oxide.

Other usual minor ingredients such as compatible optical brighteners, perfumes, dyes, pigments, soil suspending agents, fabric softeners, etc., can be incorporated, if desired in the compositions of this invention in amounts up to a total of about 10%.

The solutions which are prepared using the above compositions will ordinarily contain from about 5 p.p.m. to about 1000 p.p.m. chelating agent, preferably from 10 to 100; from about 0.5 p.p.m. to about 100 p.p.m. organic cation, preferably from 2 to 10; from about 10 p.p.m. to about 1000 p.p.m. alkaline buffering salt, preferably from 50 to 100; and from about 0.5 p.p.m. to about 100 p.p.m. antibacterial agent, preferably from 2 to 10.

All the long alkyl chains of this invention normally are mixtures of long alkyl chains (e.g., R, $R^3$, $R_5$, $R_7$, $R^{11}$, $R^{13}$ and $R^{14}$). These can be derived from naturally occurring substances such as tallow and coconut oil, and can also be derived from petroleum fractions, e.g., by polymerizing propylene or cracking waxes to form the proper chain length, e.g., in the form of an olefin. The method of deriving the alkyl chain is immaterial. The alkyl chains can be unsaturated.

The following example is illustrative and not limiting of the invention.

EXAMPLE

In the following tests, cidal activity was determined by applying the indicated concentrations of ingredients in water to 20 ml. of standard concentrations of *Escherichia coli*. The final concentration of bacteria in the test mixture was generally of the order of $10^8$ cells/ml. The bacteria/bactericide mixture was incubated at 37° C. and after an exposure time of ten minutes, 1 ml. was removed from the mixture and diluted for plate counts of survivors in brain heart infusion agar.

| Test No. | Parts per million | | | | pH | Survival, percent |
| --- | --- | --- | --- | --- | --- | --- |
| | EDTA [1] | DDA [2] | Na₂CO₃ | CNOB [3] | | |
| 1 | | | | 10 | 7.4 | 16 |
| 2 | | 100 | | 10 | 7.0 | 1.5 |
| 3 | | | 2.5 | 10 | 7.1 | 5.1 |
| 4 | | | | 100 10 | 9.3 | 0.056 |
| 5 | | 100 | 2.5 | 10 | 7.0 | 0.016 |
| 6 | | | 2.5 | 100 10 | 10.0 | 0.0032 |
| 7 | | 100 | 2.5 | 100 10 | 10.0 | 0.0011 |
| 8 | | 100 | 2.5 | 100 | 9.8 | |

| Test No. | Parts per million | | | | | | pH | Survival, percent |
| --- | --- | --- | --- | --- | --- | --- | --- | --- |
| | EDTA [1] | DDA [2] | Na₂CO₃ | DPBA [4] | TFC [5] | DBOI [6] | | |
| 9 | 100 | 1 | 100 | | | | 9.9 | 133 |
| 10 | | | 100 | | | | 10.1 | 52 |
| 11 | | | 100 | | 10 | | 10.1 | 93 |
| 12 | | | 100 | | | 1 | 10.1 | 28 |
| 13 | 100 | 1 | 100 | 2 | | | 10.0 | 7 |
| 14 | 100 | 1 | 100 | | 10 | | 9.9 | 26 |
| 15 | 100 | 1 | 100 | | | 1 | 10.0 | 1.2 |

[1] EDTA=Ethylenediaminetetraacetate (tetrasodium salt).
[2] DDA=Dodecyl dimethyl amine.
[3] CNOB=3-chloro-7-nitrodibenz(b,e)(1,4) oxiodinium bisulfate.
[4] DPBA=Diphenyl bismuth acetate.
[5] TFC=Trifluoromethyl dichlorocarbanilide.
[6] DBOI=3-chloro-dibenzoxiodinium chloride.

When in the above example the following chelating agents are substituted either wholly or in part (e.g., a 1:1 ratio by weight) for the EDTA, substantially equivalent results are obtained in that the solutions are effective in killing *E. coli*: sodium, potassium, or ammonium methylene diphosphonates, N - hydroxyethylethylenediaminetriacetates, diethylenetriaminepentaacetates, 1,2 - diaminocyclohexane - N,N′ - tetraacetates, nitrilotriacetates, and polymaleates having molecular weights of about 100,000.

When in the above example the following organic compounds capable of forming a cation are substituted, either wholly or in part (e.g., in a 1:1 molar ratio), for the DDA, substantially equivalent results are obtained in that the solutions effectively kill *E. coli*: n-octylamine, n-decylamine, n-dodecylamine, n-hexadecylamine, methyl dodecylamine, dimethyl coconut alkyl amine, dimethyl hexadecylamine, dimethyl oleylamine, coconut alkyl, 3-propylene diamine, dodecyl piperidine, N-cetyl pyridinium chloride, dimethyldodecyl sulfonium iodide, 2-dodecyl-1,3-bis (trimethylammonio) propane dibromide, dimethyldodecyl - 3(trimethylammonio) propylammonium dibromide, dodecyltrimethylammonium bromide, 1-dodecyl-2-imino imidazolidine, 1,2-bis(dimethylamino)dodecane, 2-chlorodimethyl dodecyl amine, polymerized epichlorohydrin (5 moles of monomer per molecule) quaternized with 3 moles of coconut alkyl amine, polymerized epichlorohydrin (5 moles of monomer per molecule) quaternized with 2 moles of decyl dimethylamine per molecule, alkyl ($C_8$–$C_{18}$) dimethyl benzylammonium chloride, dodecyl dimethyl benzylammonium chloride, tetradecyl dimethyl benzylammonium chloride, hexadecyl dimethyl benzylammonium chloride, (2-dimethylamino) dodecyl trimethyl ammonium iodide, 2-(trimethylammonium chloride)-1-dimethylamino dodecane, and mixtures thereof (e.g. 1:1 ratio by weight).

When in the above examples the following iodinium compounds and mixtures thereof in, e.g., 1:1 ratios by weight, are substituted, either wholly or in part, for the CNOB, substantially equivalent results are obtained in that the solutions are effective antibacterial agents against gram negative bacteria.

bis(dibenziodolium)sulfate,
dibenziodolium bisulfate,
dibenziodolium lactate,
bis(2,4-dichlorodibenziodolium)sulfate,
bis(2-chlorodibenziodolium)sulfate,
bis(3-chlorodibenziodolium)sulfate,
3,7-dichloro-10-H-dibenz(be)iodinium bisulfate dihydrate,
2,4-dibromodibenziodolium bisulfate,
2-bromodibenziodolium lactate,
bis(3,7-difluorodibenziodolium)sulfate,
3,7-dibromo-10,11-dihydrodibenz(be)iodepinium dihydrogen phosphate,
bis(3-nitrodibenziodolium)sulfate,
3,7-dinitro-10-H-dibenz(be)iodinium bisulfate,
3,7-dinitrodibenz(be)(1,4)oxiodinium bisulfate,
bis(3,7-dinitrodibenziodolium)sulfate,
bis(2-nitrodibenziodolium)sulfate,
3-chloro-7-nitrodibenz(be)(1,4)oxiodinium bisulfate,
bis[3-chloro-7-nitrodibenz(be)(1,4)oxiodinium] sulfate,
3,7-bis(trifluoromethyl)dibenziodolium iodide,
dibenziodolium 2,4,5-trichlorophenate,
2,4-diethoxydibenziodolium citrate,
3,7-dinitrodibenziodolium benzoate,
3,7-propyldibenziodolium acetate,
2-fluoro-10-H-dibenz(be)iodinium fluoride,
2-(perfluoromethyl)dibenziodolium bromide,
2-iodo-11,14-dihydro-10-H-dibenz(be)iodocinium phenate,
bis(3-chlorodibenziodolium)monohydrogen phosphate,
3-(chloro-10,11-dihydrodibenz(be)iodepinium dihydrogen phosphate,
bis(3,7-dichlorodibenziodolium)sulfate,
3,7-dinitrodibenz(be)(1,4)oxiodinium bisulfate,
3,7-disulfamoyldibenz(be)(1,4)oxiodinium bisulfate,
1,3-dichloro-7-nitrodibenz(be)(1,4)oxiodinium bisulfate,
bis[1,3-dichloro-7-nitrodibenz(be)(1,4)oxiodinium] sulfate,
3,7-dinitrodibenz(be)(1,4)oxiodinium lactate,
3-bromo-7-nitrodibenz(be)(1,4)oxiodinium bisulfate,
bis[dibenz(be)(1,4)oxiodinium]sulfate,
3,7-diaminodibenz(be)(1,4)oxiodinium iodide,
1-chloro-3,7-diaminodibenz(be)(1,4)oxiodinium bisulfate,
bis[3,7-dichlorodibenz(be)(1,4)oxiodinium]sulfate,
3,7-dibromodibenz(be)(1,4)oxiodinium chloride, 3-chlorodibenz(be)(1,4)oxiodinium chloride,
2-chlorodibenz(be)(1,4)oxiodinium bromide,
3,7-diethyldibenz(be)(1,4)oxiodinium chloride,
1,3-dichlorodibenz(be)(1,4)oxiodinium chloride,
2,3-dichlorodibenz(be)(1,4)oxiodinium bromide,
1-chlorodibenz(be)(1,4)oxiodinium chloride,
4-nitrodibenz(be)(1,4)thiaiodinium bisulfate, and
4,6-diamino(be)(1,4)thiaiodinium nitrate.

When in the above example the following detergents are added in amounts of about 100 p.p.m. to the solutions, substantially equivalent results are obtained in that the composition is an effective detergent composition having good antibacterial action:

dimethyldodecylamine oxide,
dimethyltetradecylamine oxide,
ethylmethyltetradecylamine oxide,
cetyldimethylamine oxide,
dimethylstearylamine oxide,
cetylethylpropylamine oxide;
diethyldodecylamine oxide,
diethyltetradecylamine oxide,
dipropyldodecylamine oxide,
bis-(2-hydroxyethyl)dodecylamine oxide,
bis-(2-hydroxyethyl)-3-dodecoxy-1-hydroxypropyl amine oxide;
(2-hydroxypropyl)methyltetradecylamine oxide;
dimethyloleylamine oxide;
dimethyl-(2-hydroxydodecyl)amine oxide;
dimethyldodecylphosphine oxide;
dimethyltetradecylphosphine oxide;
ethylmethyltetradecylphosphine oxide;
cetyldimethylphosphine oxide;
dimethylstearylphosphine oxide;
cetylethylpropylphosphine oxide;
diethyldodecylphosphine oxide;
diethyltetradecylphosphine oxide;
dipropyldodecylphosphine oxide;
bis-(hydroxymethyl)dodecylphosphine oxide;
bis-(2-hydroxyethyl)dodecylphosphine oxide;
(2-hydroxypropyl)methyltetradecylphosphine oxide;
dimethyloleylphosphine oxide;
dimethyl-(2-hydroxydodecyl)phosphine oxide;

and the corresponding decyl, hexadecyl and octadecyl homologs of the above compounds; nonyl phenol condensed with 10 or 30 moles of ethylene oxide per mole of phenol; propylene glycol condensed with propylene oxide to form a hydrophobic base which is then condensed with ethylene oxide, the hydrophobic base having a molecular weight of from 1500 to about 1800 and the total molecule having a molecular weight of 2,000, 3,000 or 8,000; ethylenediamine condensed with propylene oxide to form a hydrophobic group having a molecular weight of 2500 or 3,000, which are then condensed with ethylene oxide to give a molecular weight of either 5,000 or 11,000; dodecylphenol condensed with 12 moles of ethylene oxide phenol; dinonylphenol condensed with 15 moles of ethylene oxide per mole of phenol; dodecyl mercaptan condensed with 10 moles of ethylene oxide per mole of mercaptan; bis-(N - 2 - hydroxyethyl)lauramide; nonylphenol condensed with 20 moles of ethylene oxide per mole of nonyl phenol; myristyl alcohol condensed with 10 moles of ethylene oxide per mole of myristyl alcohol; lauramide condensed with 15 moles of ethylene oxide per mole of lauramide; di-iso-octylphenyl condensed with 15 moles of ethylene oxide; octadecyl methyl sulfoxide; dodecyl methyl sulfoxide; tetradecyl methyl sulfoxide; 3-hydroxytridecyl methyl sulfoxide; 3-methoxytridecyl methyl sulfoxide; 3-hydroxy-4-dodecoxybutyl methyl sulfoxide; and mixtures thereof in e.g., 1:1 ratios.

When in the above example the following alkaline buffering salts are substituted either wholly or in part for the sodium carbonate, substantially equivalent results are obtained in that the composition is an effective detergent composition having good antibacterial action: carbonates, bicarbonates, orthophosphates, monohydrogen orthophosphates, pyrophosphates, tripolyphosphates, metaphosphates, silicates (1,6 r.), citrates, acetates, hydroxides, and mixtures thereof in e.g. 1:1 ratios by weight in the form of the sodium, potassium and/or lithium salts.

All percents, ratios, and parts herein are by weight unless otherwise specified.

What is claimed is:

1. An aqueous antibacterial composition comprising:
   (a) 100 parts per million of an ethylenediaminetetraacetate, said ethylene diaminetetraacetate being selected from the group consisting of the tetrasodium salt, tetrapotassium salt and tetraammonium salt of ethylenediaminetetraacetic acid;
   (b) 2.5 parts per million of dodecyl dimethyl amine;
   (c) 10 parts per million of 3-chloro-7-nitrodibenz-(b,e)(1,4)oxiodinium bisulfate; and
   (d) water;
   said composition having a pH of from 7 to a pH of 10.

2. The antibacterial composition of claim 1 wherein the composition contains additionally 100 parts per million of sodium carbonate and wherein said composition has a pH of 10.

3. An aqueous antibacterial composition comprising:
   (a) 100 parts per million of an ethylenediaminetetraacetate, said ethylenediaminetetraacetate being selected from the group consisting of the tetrasodium salt, the tetrapotassium salt and the tetraammonium salt of ethylenediaminetetraacetic acid;
   (b) 1 part per million of dodecyl dimethyl amine;
   (c) 1 part per million of 3-chloro-dibenzoxiodinium chloride;
   (d) 100 parts per million of sodium carbonate; and
   (e) water;
   said composition having a pH of 10.

References Cited
UNITED STATES PATENTS

| | | | |
|---|---|---|---|
| 2,295,504 | 9/1942 | Shelton | 424—329 |
| 2,658,873 | 11/1953 | Marcoux | 252—106 |
| 2,875,129 | 2/1959 | Bersworth et al. | 424—319 |
| 3,011,863 | 12/1961 | Newman | 21—2.7 |
| 3,044,962 | 7/1962 | Brunt et al. | 252—110 |
| 3,079,213 | 2/1963 | Mendelsohn et al. | 8—115.5 |
| 3,079,436 | 2/1963 | Hwa | 260—567.6 |
| 3,223,704 | 12/1965 | Shibe et al. | 260—247.1 |
| 3,244,636 | 4/1966 | Reller et al. | 252—107 |
| 3,247,050 | 4/1966 | Leebrick | 424—329 |
| 3,244,636 | 4/1966 | Reller et al. | 252—107 |
| 3,297,578 | 1/1967 | Crutchfield et al. | 252—99 |
| 3,351,557 | 11/1967 | Almstead et al. | 252—106 |

OTHER REFERENCES

Chemical Abstracts, vol. 35, pp. 3596–3597 (1941).
Chemical Abstracts, vol. 55, p. 20462 (1961).

ALBERT T. MEYERS, Primary Examiner
F. E. WADDELL, Assistant Examiner

U.S. Cl. X.R.

424—319, 325, 340

PO-1050
(5/69)

UNITED STATES PATENT OFFICE
CERTIFICATE OF CORRECTION

Patent No. 3,591,679  Dated July 6, 1971

Inventor(s) Jack G. Voss

It is certified that error appears in the above-identified patent and that said Letters Patent are hereby corrected as shown below:

Column 1, line 52, "dibromoethylenediphosphonates" should read --dibromomethylenediphosphonates--.
Column 1, line 56, "homepolymeric" should read --homopolymeric--.
Column 2, line 51, "wherewherein" should read --wherein--.
Column 3, line 30, "ethanosulfate" should read --ethosulfate--.
Column 4, line 58, "geridents" should read --gredients--.
Column 7, line 31, "of" should read --and--.
Column 8, line 46, "2-hydroxyethyl(lauramide" should read --2-hydroxyethyl)lauramide--.
Column 8, line 68, "$R_5$, $R_7$" should read --$R^5$, $R^7$--.
Column 9, on or about line 22, Test No. 8, under the column marked Survival, percent, should read --36.--.

Signed and sealed this 7th day of March 1972.

(SEAL)
Attest:

EDWARD M.FLETCHER,JR.
Attesting Officer

ROBERT GOTTSCHALK
Commissioner of Patents